United States Patent [19]

Perea

[11] Patent Number: 4,662,660
[45] Date of Patent: May 5, 1987

[54] WELDLESS HIGH-PRESSURE PIPE FITTING

[76] Inventor: Jose A. Perea, 7949 Wistful Vista, Santee, Calif. 92071

[21] Appl. No.: 674,789

[22] Filed: Nov. 26, 1984

[51] Int. Cl.⁴ ............................................. F16L 23/00
[52] U.S. Cl. .................... 285/342; 285/369; 285/363
[58] Field of Search ............. 285/342, 414, 405, 369, 285/339, 421, 363

[56] References Cited

U.S. PATENT DOCUMENTS

| | | | |
|---|---|---|---|
| 91,319 | 6/1869 | Fifield | 285/342 |
| 212,257 | 2/1879 | Norris, Jr. | 285/369 X |
| 672,244 | 4/1901 | Traunfels | 285/342 X |
| 1,219,978 | 3/1917 | Masters | 285/414 X |
| 1,586,105 | 5/1926 | Moulet | 285/906 |
| 2,001,614 | 5/1935 | Johnson | 285/369 |
| 2,215,476 | 9/1940 | Peters | 285/342 X |
| 2,496,402 | 2/1950 | McVeigh et al. | 285/342 X |
| 2,701,731 | 2/1955 | Risley | 285/342 |

FOREIGN PATENT DOCUMENTS 0070186 1/1916 Switzerland .................. 285/342

Primary Examiner—Thomas F. Callaghan
Attorney, Agent, or Firm—Fulwider, Patton, Rieber, Lee & Utecht

[57] ABSTRACT

A weldless high-pressure pipe fitting, which can be incorporated in a pipe flange or pipe coupling, utilizing a deformable sealing sleeve of ductile material having a constant inside diameter sized to closely fit over the end of a pipe of a given size without galling and an outer frusto-conical surface which mates with a complementary frusto-conical inner surface of a rigid collar which tapers to a diameter equal to the inside diameter of said sealing sleeve. Said sealing sleeve annularly protrudes from said collar so that a rigid circular locking flange may be tightened against the end of said collar from which said sealing sleeve protrudes, circularly compressing said sealing sleeve between the outer surface of said pipe and the inner frusto-conical surface of said collar, locking and sealing said collar to the end of said pipe.

6 Claims, 4 Drawing Figures

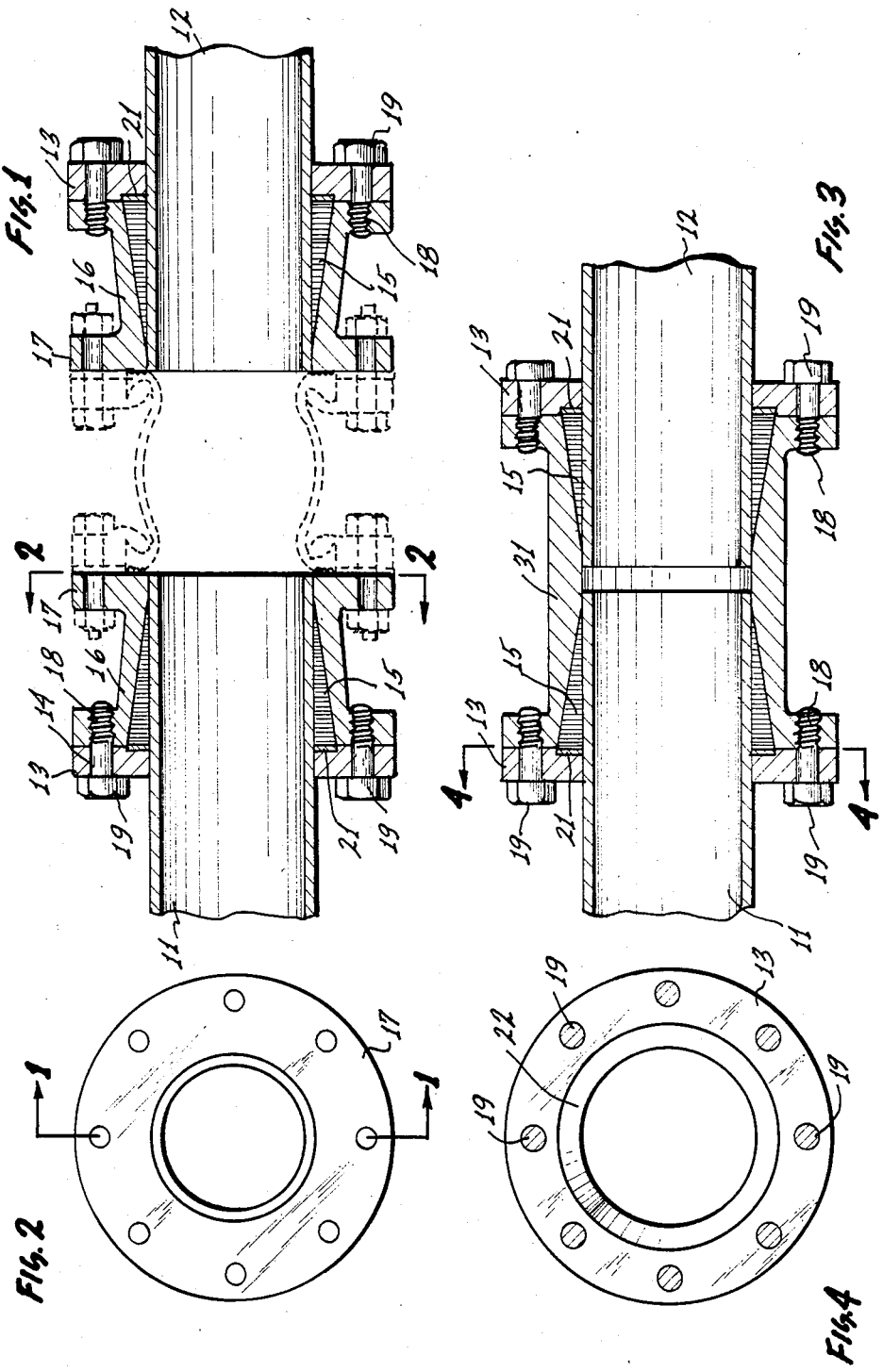

WELDLESS HIGH-PRESSURE PIPE FITTING

FIELD OF THE INVENTION

The present invention relates to high-pressure pipe fittings, and particularly to those which may be installed without the use of heat or open flame.

BACKGROUND OF THE INVENTION

It is frequently necessary to make repairs to ruptured or leaking high-pressure pipes in areas of extreme explosion or fire hazard, such as the engine rooms of ships or refineries. Typical repairs consist of replacing a defective section of pipe with a new section either by directly welding the new section in place or by bolting expansion joints between welded flanges at both ends of the new section and welded flanges at the open ends of the pipeline where the damaged section was removed. In either case, on-site welding is necessary, and the areas to be worked must be freed of all flammable gases and liquids. For welding operations in new ships or new refineries, it is usually neither difficult nor costly to comply with this mandate. However, the process of "gas freeing" the engine room of an operating ship or a particular sector of a refinery is normally a costly and lengthy process.

It would be highly advantageous to be able to effect the reliable flanging or coupling of large-diameter, high-pressure pipes without the use of heat or flame. Flexible couplings for joining plain-end tubes or pipes are available from several manufacturers. Typically, these couplings comprise a tubular housing into which a tube or pipe is inserted at either end. Circular resilient seals are then clamped to seal the gaps between the housing and the tubes or pipes. Although a joint made with this type of coupling lacks the reliability and durability of a welded joint or an expansion joint between two welded flanges, it does have the advantage of simplicity of installation without the use of heat or flame.

A search made by the applicant for prior art related to the invention has revealed numerous pipe fittings and connectors. U.S. Pat. No. 2,011,433, issued to Gabriel E. Blagg on Mar. 25, 1933 teaches the construction of a pipe coupling especially useful for joining sections of thin-wall tubing. Although complementary frusto-conical surfaces are used to secure a tight joint without the use of gaskets or packing, the joint necessarily reduces the inside diameter of the line and also deforms the ends of the sections of tubing to be joined. U.S. Pat. Nos. 1,821,863 and 1,821,865, both issued to Wylie G. Wilson on Sept. 1, 1931, teach the use of a tapered seal to provide fluid-tight joints. However the method requires that the ends of the pipes to be joined be fitted with specially-designed flanges, which presumably must be welded to the ends of the pipes. U.S. Pat. No. 3,749,426, issued to Cassius Tillman on July 31, 1973, teaches the use of a pipe joint seal in the form of a tubular member having beveled ends, which is compressed between the recesses of aligned flanged pipes connected together under stressed conditions, such as with bolts, studs or clamps. Once again, however, the special flange must be welded to the ends of the pipes to be joined. There is a very real commercial need for a pipe fitting which can be tightly secured to the end of a rigid-wall, high-pressure pipe so that it may be flanged or coupled without the use of welding.

SUMMARY OF THE INVENTION

The primary objective of this invention is to provide a means for flanging and coupling high-pressure, rigid-wall pipes without the use heat or flame to that the flanging or coupling process may be carried out under conditions where "gas freeing" would be essential were welding used in the operation.

A secondary objective of the present invention is to provide a pipe fitting which neither visibly deforms nor reduces the inside diameter of the pipeline.

The present invention may be used to flange or couple rigid-wall pipes of any diameter. On a three-inch pipe, the fitting has been tested to withstand pressures of X,XXX kgs per $cm^2$.

BRIEF DESCRIPTION OF THE DRAWINGS

FIG. 1 is a cross-sectional view of a pair of identical connector flange assemblies, each of which incorporates the weldless high-pressure fitting, connected by means of a commercially-available expansion joint, the outline of which is shown by broken lines;

FIG. 2 is a view taken along line 2—2 showing the entire connector flange assembly mounted on a pipe;

FIG. 3 is a second embodiment of the invention showing the joining of two pipes by means of a coupling which incorporates two of the weldless high-pressure fittings;

FIG. 4 is a view taken along line 4—4 showing the entire circular locking flange with a circular recess.

DESCRIPTION OF THE PREFERRED EMBODIMENT OF THE INVENTION

Referring now to FIG. 1, two sections of pipe 11 and 12 are shown connected by means of a commercially-available expansion joint bolted to a pair of connector flange assemblies constructed in accordance with the present invention. Circular locking flange 13 has an inside diameter closely sized to enable it to slide over the end of pipe 11 without galling. Locking flange 13 has a first series of holes 14 arranged in a radial pattern. The tubular deformable locking sleeve 15 has an inside diameter closely sized to enable it to slide over the end of pipe 11 without galling. The outer surface of the locking sleeve tapers to form a frusto-conical section. The locking sleeve 15 is mounted on the pipe 11 so that the thickest edge of the sleeve faces locking flange 13. A rigid collar 16 incorporating a connector flange 17 has a tapered frusto-conical inner surface which mates with the frusto-conical outer surface of the locking sleeve 15 when the collar 16 is slid over the end of the pipe 11. The collar 16 has a second series of threaded holes 18 arranged in a circular pattern identical to the hole pattern of locking flange 13. The thickest edge of locking sleeve 15 annularly protrudes from the collar. When locking flange 13 is bolted against the collar 16 by means of a series of bolts 19, each of which is inserted through a hole 14 and tightened in a threaded hole 18, the annularly protruding edge of sealing sleeve 15 is forced deeper into the tapered recess formed by the outer surface of the pipe 11 and the tapered inner surface of the collar 16, locking and sealing collar 16 in a fixed position on pipe 11. The amount which sealing sleeve 15 is forced into the tapered recess is determined by the thickness of a circular shim 21 which is placed between the locking flange 13 and the collar 16. The shim 21 fits into the circular recess 22 in locking flange 13.

Referring now to FIG. 3, two sections of pipe are shown connected by means of a coupling constructed in accordance with the present invention. The locking flanges 13, sealing sleeves 15, shims 21, first series of holes 14 and second series of holes 18 are identical to those of FIG. 1 for pipes having identical diameters. In FIG. 1, two collars 16 are portrayed, each incorporating a connector flange 17. In FIG. 3, the double flanged collars are replaced by a single collar 31 which bridges both sections of pipe 11 and 12.

What is claimed is:

1. A fitting for clamping to a pipe to form a weldless, high-pressure, leakproof connection therebetween, the fitting comprising:

a rigid, generally cylindrical collar including a longitudinal interior opening having a tapered portion and a constant diameter portion, the constant diameter portion being sized to slide onto the pipe in close-fitting, non-galling relationship, the tapered portion tapering from the constant diameter portion to a larger diameter extremity to define a frusto-conical cavity, the collar further including a circumferential collar flange having a plurality of circumferentially spaced apart first fastener means;

a frusto-conical locking sleeve including a constant diameter inner surface sized to slide onto the pipe in close-fitting, non-galling relationship and further including a tapered exterior surface complemental to the tapered portion of the collar and slidable into the frusto-conical cavity of the collar in close-fitting relationship;

an annular locking flange including a constant diameter interior opening sized to slide onto the pipe in close-fitting, non-galling relationship and further including a plurality of circumferentially spaced apart second fastener means complemental to the first fastener means; and a plurality of circumferentially spaced apart clamping means for axially urging together the first and second fastener means to clamp the locking flange forcibly to the collar flange whereby the locking flange is pressed tightly against the sleeve to urge the sleeve forcibly into the frusto-conical cavity in the collar and compress the sleeve against the pipe, thereby tightly sealing the pipe to the collar and clamping the locking flange in fixed relationship to the collar whereby relative movement between the pipe and collar is prevented, said locking flange having a recessed channel extending around said opening, an annular shim in said recessed channel, said shim compressed between said locking flange and said frusto-conical locking sleeve when said locking flange is clamped in abutting relation with said collar flange.

2. A fitting according to claim 1 wherein the clamping means comprise bolts.

3. A fitting according to claim 1 wherein the sleeve has a movable relationship with the pipe and with the collar prior to the locking flange being pressed against the sleeve.

4. A fitting for clamping to a pipe to form a weldless, high-pressure, leakproof connection therebetween, the fitting comprising:

a rigid, generally cylindrical collar including a longitudinal interior opening having a tapered portion and a constant diameter portion, the constant diameter portion sized to slide onto the pipe in close-fitting, non-galling relationship, the tapered portion tapering from the constant diameter portion to a larger diameter extremity to define a frusto-conical cavity, the collar further including a circumferential collar flange;

a frusto-conical locking sleeve including a constant diameter inner surface sized to slide onto the pipe in close-fitting, non-galling relationship and further including a tapered exterior surface complemental to the tapered portion of the collar and slidable into the frusto-conical cavity of the collar in close-fitting relationship;

an annular locking flange including a constant diameter interior opening sized to slide onto the pipe in close-fitting, non-galling relationship; and a plurality of circumferentially spaced apart fastener means carried by the collar flange and the locking flange and operative to axially urge said flanges together to clamp the locking flange forcibly to the collar whereby the locking flange is pressed tightly against the sleeve to urge the sleeve forcibly into the frusto-conical cavity of the collar and compress the sleeve against the pipe, thereby tightly sealing the pipe to the collar and clamping the locking flange in fixed relationship to the collar whereby relative movement between the pipe and the collar is prevented, said locking flange having a recessed channel extending around said opening, an annular shim in said recessed channel, said shim compressed between said locking flange and said frusto-conical locking sleeve when said locking flange is clamped in abutting relation with said collar flange.

5. A fitting according to claim 4 wherein the fastener means comprise bolts.

6. A fitting according to claim 4 wherein the sleeve has a movable relationship with the pipe and with the collar prior to the locking flange being pressed against the sleeve.

* * * * *